(No Model.)
A. F. GAIENNIE.
VACUUM PAN.
No. 551,161. Patented Dec. 10, 1895.
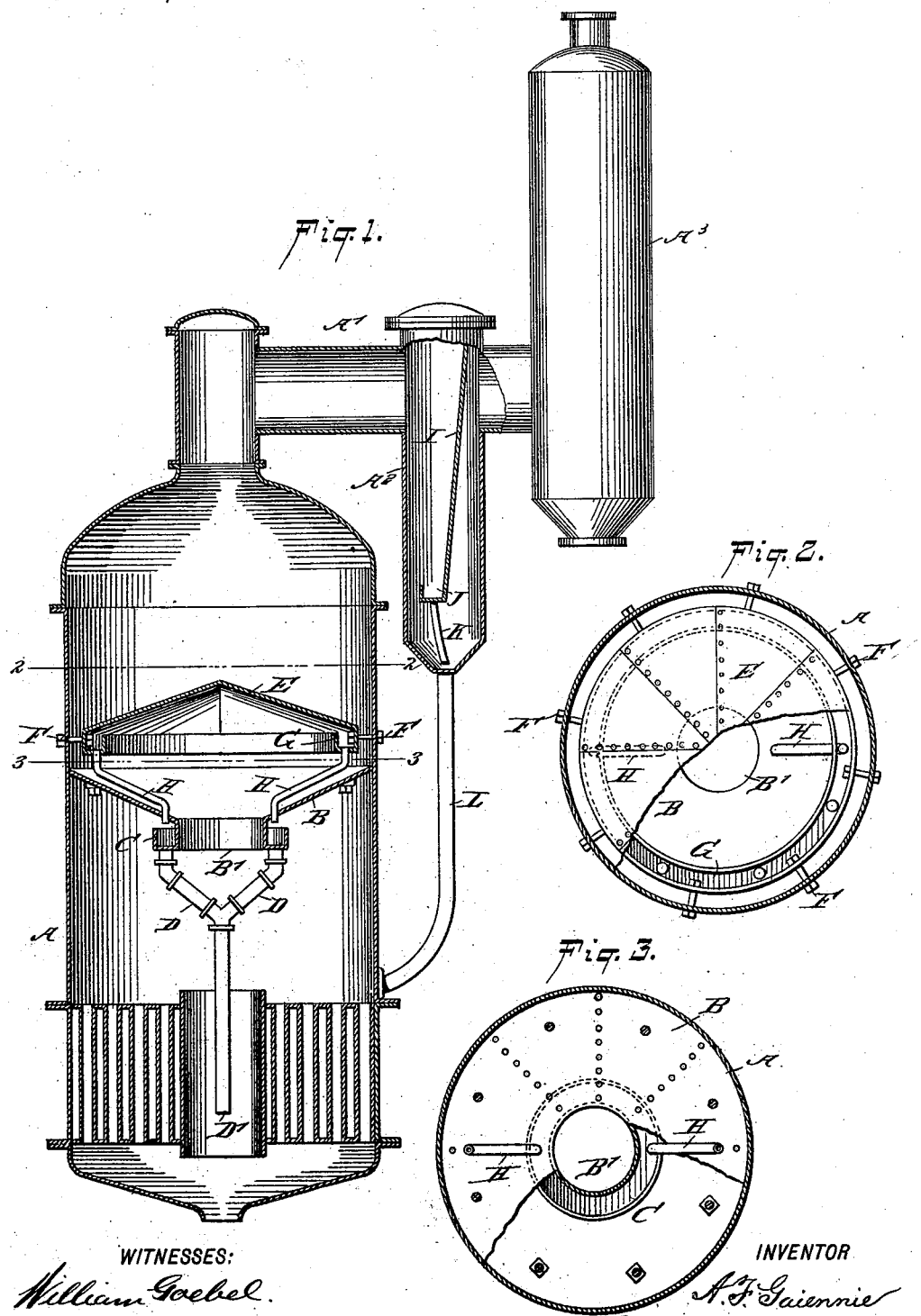
WITNESSES:
INVENTOR
A. F. Gaiennie
BY
ATTORNEYS.

United States Patent Office.

ALPHONSE FLORESTAN GAIENNIE, OF LA FOURCHE, ASSIGNOR OF ONE-THIRD TO JOHN LECHE, OF FLORENCE, LOUISIANA.

VACUUM-PAN.

SPECIFICATION forming part of Letters Patent No. 551,161, dated December 10, 1895.

Application filed February 6, 1895. Serial No. 537,491. (No model.)

*To all whom it may concern:*

Be it known that I, ALPHONSE FLORESTAN GAIENNIE, of La Fourche, in the parish of La Fourche and State of Louisiana, have invented a new and Improved Separator, of which the following is a full, clear, and exact description.

The object of the invention is to provide a new and improved separator, designed for use on evaporators for vacuum processes, to separate and save liquid carried by the vapors, the device being also designed for use in separating oil and grease from exhaust-steam, the separator being simple and durable in construction.

The invention consists principally of one or more plates in the path of the vapors and a receiving-receptacle at the lower edge of each plate, and into which pass the liquids carried by the vapors and separated therefrom on striking the plates.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement as applied on an evaporator for sugar-cane juice. Fig. 2 is a sectional plan view of the same on the line 2 2 of Fig. 1 with parts broken out, and Fig. 3 is a similar view of the same on the line 3 3 of Fig. 1 and with parts broken out.

The improved evaporator shown in the drawings is provided with the usual casing A, in the upper part of which is secured an inverted cone-shaped plate B, formed in its apex with an opening B' for the discharge of the vapors, part of which strike the under side of the plate B to separate the liquid therefrom, the liquid flowing down to the lower edge of the plate and into an annular receptacle C, formed on the plate at the opening D'. From the bottom of this receptacle C lead branch pipes D to a central pipe D' for returning the liquid to the mass boiling in the lower part of the casing A.

Directly above the plate B is arranged a second cone-shaped plate E, its base terminating at a suitable distance from the interior wall of the casing A to form a passage for the vapors as the latter ascend in the casing. This plate E is supported at its base by stay-bolts F from the casing A, and on the lower edge of the plate is formed an annular receptacle G, adapted to receive the liquid separated from the vapor striking the under side of the plate E and flowing down the said under side into the receptacle C.

The bottom of the receptacle G is connected by pipes H with the receptacle C, so that the liquid accumulating in the receptacle G can pass into the receptacle C, and from the latter to the pipes D and D' to the liquid boiling in the evaporator.

Now it will be seen that by the arrangement described the vapors passing through the opening B' and rising above the plate B strike the under side of the plate E to separate the liquid, the vapors then being deflected in a downward direction to pass through the space between the base of the plate E and the casing A.

In the outlet A' of the casing A is formed a vertically-disposed collecting-tube $A^2$, formed with a transverse plate I, slightly inclined, as shown, and formed at its lower end with a receptacle J, adapted to receive the liquid separated from the escape vapors and striking the plate I before their passage to the final outlet $A^3$. The receptacle J is provided with a pipe K, discharging into a pipe L, leading from the tube $A^2$ back into the liquid contained in the evaporator.

It will be seen by the arrangement described that the ascending vapors are brought successively in contact with plates to separate the liquid from the vapor, to gather the liquid, and to return the same to the mass boiling in the evaporator.

Having thus fully described my invention, I claim as new and desire to secure by Letters Patent—

1. A device of the character described, comprising an inverted cone-shaped plate having a central opening, and an annular receptacle secured to and extending outwardly from the lower edge of the plate, substantially as shown and described.

2. A device of the character described, comprising an inverted cone-shaped plate having a central opening, an annular receptacle at the lower edge of the plate, a second plate suspended above the first named plate and cone-shaped in cross section, the lower edge of this second plate being provided with an annular receptacle connected by pipes with the receptacle of the first named plate, pipes connecting the two receptacles with each other, and pipes for carrying off the liquid from the first named receptacle, substantially as shown and described.

3. In a device of the character described the combination of a casing having an inlet at its base and an outlet at its upper portion, an inverted cone shaped plate extending across said casing and having its edges secured thereto, said plate being provided with an opening at its apex, an annular receptacle secured to the outer side of the lower edge of said plate surrounding said opening therein and adapted to receive liquid flowing down the outer side of the plate, and an outlet pipe for said receptacle, substantially as set forth.

4. In a device of the character described the combination of a casing having an inlet at its base and an outlet at its upper portion, an inverted cone-shaped plate extending across said casing and having its edges secured thereto, said plate being provided with an opening at its apex, an annular receptacle secured to the lower edge of said plate surrounding said opening and adapted to receive liquid flowing down the outer side of said plate, an outlet pipe for the receptacle, a cone-shaped plate suspended above said inverted cone-shaped plate with its outer edges separated from the walls of the casing to provide a passage for the vapors, an annular receptacle secured to the outer edge of said plate and adapted to receive liquid flowing down the inner face of the same, and outlet pipes leading from said last named receptacle down through the first named cone shaped plate into the receptacle at the lower part thereof, substantially as set forth.

ALPHONSE FLORESTAN GAIENNIE.

Witnesses:
H. N. COULON,
JOHN LECHE.